(12) United States Patent
Zhu

(10) Patent No.: US 11,669,241 B2
(45) Date of Patent: Jun. 6, 2023

(54) TOUCH CONTROL METHOD, APPARATUS, AND DEVICE AND COMPUTER-READABLE STORAGE MEDIUM

(71) Applicant: Lenovo (Beijing) Limited, Beijing (CN)

(72) Inventor: Helin Zhu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/475,023

(22) Filed: Sep. 14, 2021

(65) Prior Publication Data

US 2022/0197497 A1 Jun. 23, 2022

(30) Foreign Application Priority Data

Dec. 23, 2020 (CN) .......................... 202011538359.6

(51) Int. Cl.
*G06F 3/04883* (2022.01)
*G06F 3/0482* (2013.01)

(52) U.S. Cl.
CPC ........ *G06F 3/04883* (2013.01); *G06F 3/0482* (2013.01)

(58) Field of Classification Search
CPC .. G06F 3/04883; G06F 3/0482; G06F 1/1643; G06F 1/1616; G06F 1/1647; G06F 1/1694; G06F 3/04886; G06F 2200/1637; G06F 2203/04804
See application file for complete search history.

(56) References Cited

U.S. PATENT DOCUMENTS

| 2013/0152001 | A1* | 6/2013 | Lovitt | G06F 9/451 715/765 |
| 2013/0300668 | A1* | 11/2013 | Churikov | G06F 1/169 345/173 |
| 2014/0160073 | A1* | 6/2014 | Matsuki | G06F 3/04886 345/173 |
| 2018/0046367 | A1* | 2/2018 | Kim | G06F 3/0482 |
| 2020/0286449 | A1* | 9/2020 | Yang | H04N 13/183 |

* cited by examiner

*Primary Examiner* — Stephen G Sherman
(74) *Attorney, Agent, or Firm* — Anova Law Group, PLLC

(57) ABSTRACT

The present disclosure provides a touch control method. The method includes obtaining attitude information and/or holding information of an electronic device; determining a target area located in a first display area of the electronic device and/or a second display area of the electronic device, and presenting a control mark in the first display area or the second display area based on the attitude information and/or the holding information; generating a touch parameter based on size information of the target area; and controlling the control mark to execute an operation instruction corresponding to a touch operation based on the touch parameter in response to the touch operation for the target area.

18 Claims, 5 Drawing Sheets

TOUCH CONTROL METHOD, APPARATUS, AND DEVICE AND COMPUTER-READABLE STORAGE MEDIUM

CROSS-REFERENCES TO RELATED APPLICATION

This application claims priority to Chinese Patent Application No. 202011538359.6, filed on Dec. 23, 2020, the entire content of which is incorporated herein by reference.

FIELD OF TECHNOLOGY

The present disclosure relates to the technical field of electronic information and, more specifically, to a touch control method, apparatus and device, and a computer-readable storage medium.

BACKGROUND

With the development of science and technology, more and more laptops are being developed with dual screens. The touchpad of the dual-screen laptops is generally set at a fixed position on the screen when implementing the touchpad function. For example, the touchpad can be fixed on the bottom or right side of a C screen (that is, the screen parallel to the supporting side of the laptop), and the size of the touchpad (such as a rectangle with a certain length and width) can remain unchanged to realize the user's touch control of the dual screens. However, with the increase in the use cases of dual-screen laptops, more and more use attitudes and holding states of dual-screen laptops are becoming available. When the user holds and uses the laptop in different attitudes, the touchpad is still fixed in position with the same size, which affects the applicability of the laptop, reduces the convenience of the laptop, and causes great inconvenience to the user's operation.

BRIEF SUMMARY OF THE DISCLOSURE

One aspect of the present disclosure provides a touch control method. The method includes obtaining attitude information and/or holding information of an electronic device; determining a target area located in a first display area of the electronic device and/or a second display area of the electronic device, and presenting a control mark in the first display area or the second display area based on the attitude information and/or the holding information; generating a touch parameter based on size information of the target area; and controlling the control mark to execute an operation instruction corresponding to a touch operation based on the touch parameter in response to the touch operation for the target area.

Another aspect of the present disclosure provides an electronic device comprising a first display area, a second display area, a processor, and a memory storing program instructions that. When executed by the processor, the program instructions cause the processor to implement a method comprising obtaining attitude information and/or holding information of the electronic device; determining a target area located in the first display area and/or the second display area, and present a control mark in the first display area or the second display area based on the attitude information and/or the holding information; generating a touch parameter based on size information of the target area; and controlling the control mark to execute an operation instruction corresponding to a touch operation based on the touch parameter in response to the touch operation for the target area.

BRIEF DESCRIPTION OF THE DRAWINGS

In order to more clearly illustrate technical solutions in embodiments of the present disclosure, drawings for describing the embodiments are briefly introduced below. Obviously, the drawings described hereinafter are only some embodiments of the present disclosure, and it is possible for those ordinarily skilled in the art to derive other drawings from such drawings without creative effort.

DETAILED DESCRIPTION

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Throughout the description, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

It should also be noted that a term "first/second/third" involved in an exemplary embodiment merely distinguishes similar objects and does not represent a specific order of the objects. Understandably, the specific order or sequence of "first/second/third" may be interchanged with permission. It should be understood that the objects distinguished by "first/second/third" may be interchanged where appropriate so that exemplary embodiments described here can be implemented in an order other than those illustrated or described here.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure.

Figure 1:
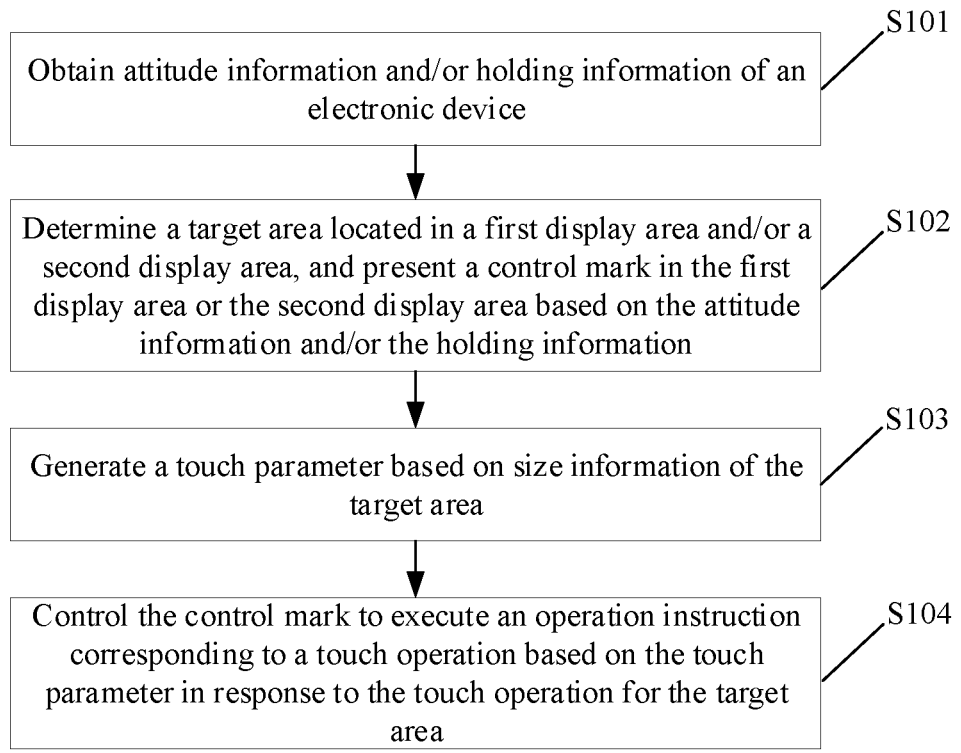
FIG. 1 is a flowchart of an implementation process of a touch control method according to an embodiment of the present disclosure.

An embodiment of the present disclosure provides a touch control method, which can be applied to an electronic device. The method provided in the embodiments of the present disclosure can be implemented by a computer program. When the computer program is executed, each process in the touch control method provided in the embodiments of the present disclosure will be completed. In some embodiments, the computer program can be executed by a processor in the electronic device. FIG. 1 is a flowchart of an implementation process of a touch control method according to an embodiment of the present disclosure. The method will be described in detail below.

S101, obtaining attitude information and/or holding information of the electronic device.

The electronic device may include a first display area and a second display area. The electronic device can be a portable mobile terminal with two display screens. For example, the electronic device can be a dual-screen laptop, a dual-screen AR device, a dual-screen VR device, etc. Take the electronic device as a dual-screen laptop as an example. When the laptop is closed and placed on the desktop, the side with the logo on top may be side A, the bottom side that is in contact with the desktop may be side D, the back of side A may be side B, and the back of side D may be side C. In this case, the first display area may be side B of the laptop, and the second display area may be side C of the laptop.

Figure 2A:
FIG. 2A is a schematic diagram of an attitude of an electronic device according to an embodiment of the present disclosure.
Figure 2B:
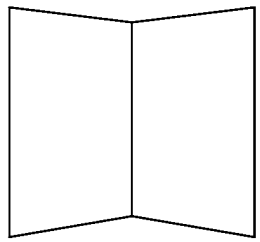
FIG. 2B is a schematic diagram of another attitude of the electronic device according to an embodiment of the present disclosure.

The use attitude of the electronic device may include at least the horizontally opened attitude as shown in FIG. 2A and the vertically opened attitude as shown in FIG. 2B. The holding information of the electronic device may be used to indicate whether the electronic device is in a holding state or a non-holding state. Further, the attitude information may be detected and obtained by a gravity sensor of the electronic device, and the holding information may be detected and obtained by a touch sensor of the electronic device.

In some embodiments, when the electronic device is turned on, the gravity sensor and the touch sensor of the electronic device may detect and obtain the attitude information and the holding information of the electronic device in real time. On one hand, the gravity sensor can analyze the obtained attitude information, and determine whether the electronic device is in a horizontally opened attitude or a vertically opened attitude based on the analysis result. On the other hand, the touch sensor can analyze the obtained holding information. When the holding information is empty, it may indicate that the electronic device is not being held by the user, but placed on the surface of an object such as a desktop. When the holding information is not empty, it may indicate that the user is holding the electronic device. Then, the electronic device may further determine the user's holding area based on the analysis result of the holding information.

S102, determining a target area located in the first display area and/or the second display area, and presenting a control mark in the first display area or the second display area based on the attitude information and/or the holding information.

In some embodiments, the target area may be an area that can receive and respond to touch operations, and the position and size of the target area may be variable. The control mark may be a display mark corresponding to a mouse. When the process at S102 is being implemented, when the electronic device is in the non-holding state, then the holding information will be empty. At this time, the electronic device may determine the target area based on the obtained attitude information. Further, when the electronic device is in the horizontal open position, a first area in the second display area may be determined as the target area. In actual implementation, combined with the usage habits of most users, the first area can be the area below the second display area, and the first area can be a relatively large rectangular area. When the electronic device is in the vertical open position, a third area of the first display area may be determined as the target area, or a fourth area of the second display area may be determined as the target area. Further, the third area of the first display area and the fourth area of the second display area may be determined as the target area. In actual implementation, combined with the usage habits of most users, the third area can be an area on the side of the first display area away from the second display area, the fourth area may be an area on the side of the second display area away from the first display area, and the area of the third area or the fourth area may be smaller than the area of the first area. It should be noted that the position and size of the target area may change under different attitudes of the electronic device.

In other embodiments, when the electronic device is in a holding state, the electronic device may determine the target area based on the obtained attitude information and holding information. Further, when the electronic device is in the horizontal open position, the second area in the second display area including the holding area may be determined as the target area. When the electronic device is in the vertical open position, a fifth area in the first display area including the holding area may be determined as the target area, or a sixth area in the second display area including the holding area may be determined as the target area. In addition, the fifth area in the first display area including the holding area and the sixth area in the second display area including the holding area may be determined as the target area.

In some embodiments, when the user holds the electronic device, the electronic device may also directly determine the area including the holding position as the target area based on the holding information. In addition, the control mark may be presented in the target area or outside the target area.

S103, generating a touch parameter based on size information of the target area.

In the embodiments of the present disclosure, the shape of the target area may be rectangle, square, circle, semicircle, ellipse, etc. The size information may be the length, width, side length, diameter, circumference, area, major axis length, minor axis length, etc. The touch parameter may be a proportional relationship between a first displacement of the user in the target area and a second displacement of the control mark, and the touch parameter may indicate the touch accuracy or touch speed of the target area. In actual implementation, the electronic device may generate corresponding touch parameters based on the size information of the target area.

In some embodiments, when the electronic device is in the horizontal open position and is not being held, at this time, the area of the target area is relatively large, and the touch parameter of relatively high touch accuracy or relatively slow touch speed may be generated. When the electronic device is in the vertical open position and is being held in a holding state, at this time, the area of the target area is relatively small, and touch parameter of relatively low touch accuracy or relatively fast touch speed may be generated.

S104, in response to a touch operation for the target area, controlling the control mark to execute an operation instruction corresponding to the touch operation based on the touch parameter.

In the embodiments of the present disclosure, the touch operation may be a scroll operation, open operation, close operation, selection operation, etc., and the user may perform the touch operation through the target area. Further, after receiving the touch operation of the user, the electronic device can control the control mark to execute the operation instruction corresponding to the touch operation based on the determined touch accuracy or touch speed.

The control method provided in the embodiments of the present disclosure can be applied to an electronic device, and the electronic device may include a first display area and a second display area. The control method may include obtaining the attitude information and/or holding information of the electronic device; determining the target area located in the first display area and/or the second display area based on the obtained information and displaying a control mark in the first display area or the second display area, where the position and size of the target area may be variable; generating the touch parameter based on the size information of the target area; and controlling the control mark to execute the operation instruction corresponding to the touch operation based on the touch parameter in response to the touch operation for the target area. In this way, the position and size of the target area can be changed, thereby improving the applicability and convenience of electronic devices, enriching the function of electronic devices, and enhancing the performance of electronic devices. At the same time, it is convenient for the user to operate the target area of the electronic device, thereby meeting the user's diversified usage demand of the electronic device and improving work efficiency.

Figure 3:
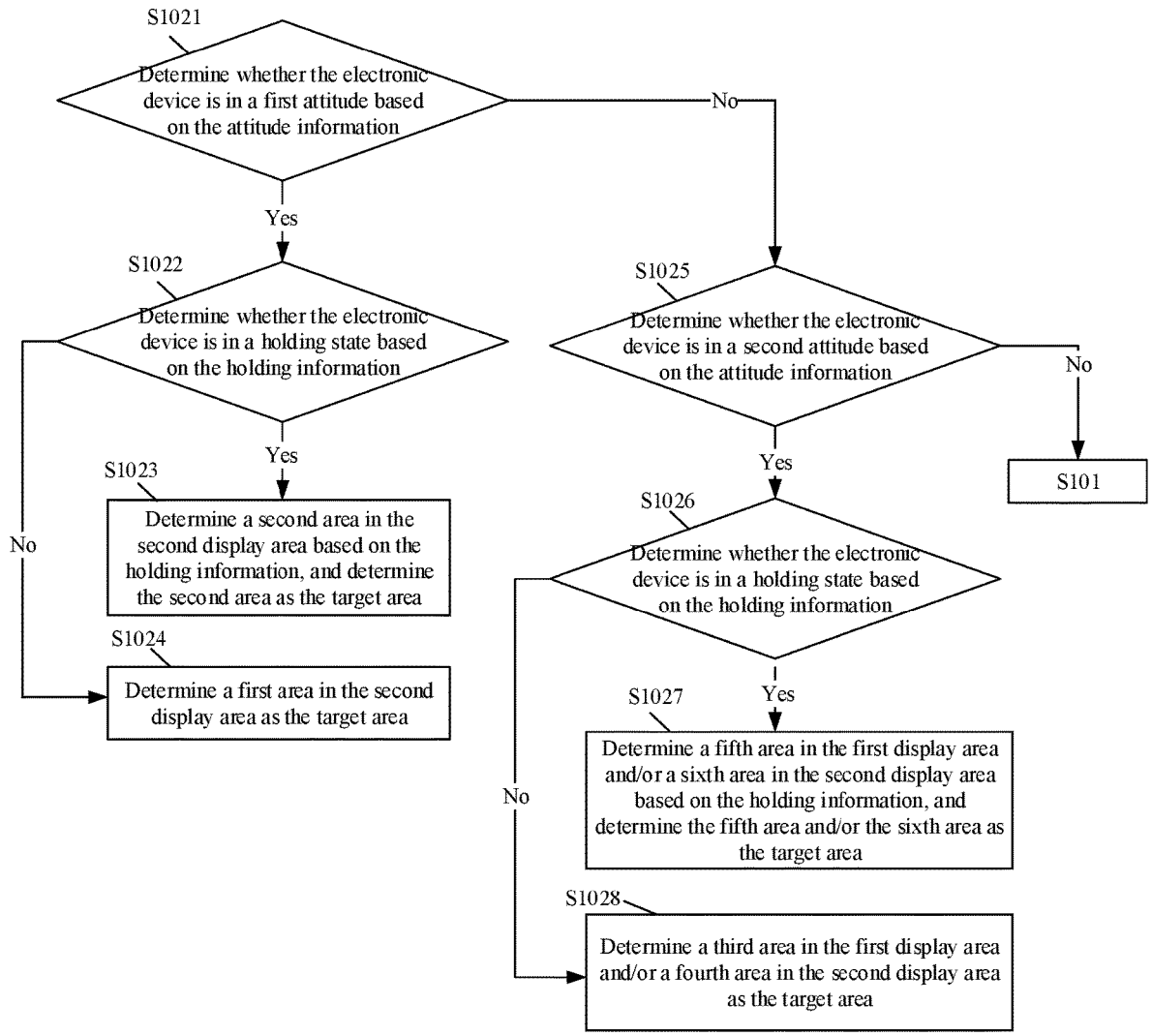
FIG. 3 is a flowchart of another implementation process of the touch control method according to an embodiment of the present disclosure.

In some embodiments, the process at S102 can be realized through processes S1021 to S1028 as shown in FIG. 3.

S1021, determining whether the electronic device is in a first attitude based on the attitude information.

When implementing the process at S1021, a first angle between the second display area and the horizontal plane and a second angle between the first display area and the horizontal plane may be determined based on the attitude information, and then whether the first angle is less than a first angle threshold and the second angle is greater than a second angle threshold may be determined. If the first angle is less than the first angle threshold and the second angle is greater than the second angle threshold, the electronic device is determined to be in the first attitude, and the process at S1022 can be performed at this time. If the first angle is greater than or equal to the first angle threshold and the second angle is less than or equal to the second angle threshold, the electronic device is determined to be not in the first attitude, and the process at S1025 can be performed at this time.

In some embodiments, the first angle threshold may be 5°, and the first angle being less than 5° may indicate that the position relationship between the second display area and the horizontal plane is parallel or substantially parallel. The second angle threshold may be 85°, and the second angle being greater than 85° may indicate that the position relationship between the first display area and the horizontal plane is perpendicular or substantially perpendicular to each other. Of course, the first angle and the second angle may be preset by the manufacturer, or may be set by the user based on usage habits, which is not limited in the embodiments of the present disclosure.

S1022, determining whether the electronic device is in a holding state based on the holding information.

When implementing the process at S1022, the electronic device may analyze the holding information obtained by the touch sensor in real time. If the analysis result indicates that the electronic device is in the holding state, then the electronic device can be determined to be in a first holding attitude, and the process at S1023 can be performed at this time. If the analysis result indicates that the electronic device is in the non-holding state, then the electronic device can be determined to be in a non-holding first attitude, and the process at S1024 can be performed at this time.

S1023, determining the second area of the first display area based on the holding information, and determining the second area as the target area.

In some embodiments, the second area may include a holding area corresponding to the holding information. At this time, the electronic device may be in a horizontal open position, and the electronic device may be in a holding state. The user's holding area may be determined based on the holding information, the second area including the holding area on the second display area may be determined, and the second area may be determined as the target area.

Figure 4:
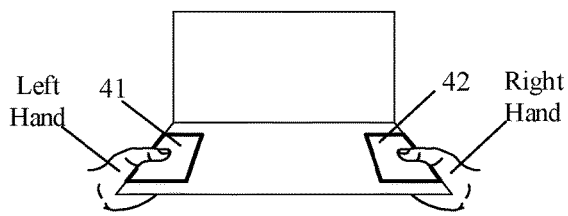
FIG. 4 is a schematic diagram of a target area when the electronic device is laid flat according to an embodiment of the present disclosure.

In some embodiments, the target area as shown in FIG. 4 may be determined through the process at S1023. In FIG. 4, the user holds the electronic device with the left hand and the right hand, which corresponding forms a target area 41 and a target area 42. In this case, when the target area actually receives and responds to the touch operation, the target area 41 and the target area 42 need to be controlled, and the control method may be as follow.

In the first control method, the touch sensor may detect the contact between the left and right hands and the second display area. When the left hand has been in contact with the second display area and the contact area has not changed for a long time, and the right hand is in intermittent contact with the second display area and the contact area is changing, it may indicate that the left hand is being used to hold and fix the electronic device, and the right hand is being used to touch and operate the electronic device. Therefore, the target area 42 corresponding to the right hand can be enabled, such that the right hand can perform touch operations on the first display area and the second display area through the target area 42, thereby realizing the coordinated control of the target area 41 and the target area 42.

In the second control method, the target area 41 and the target area 42 may be enabled at the same time, such that the left hand can perform touch operations on the first display area (or the second display area), while enabling the right hand to perform touch operations on the second display area (or the first display area) through the target area 42, thereby realizing the coordinated control of the target area 41 and the target area 42.

The foregoing control methods are example descriptions, and the control method is being used to ensure that at the deciding time, the display area determined in the first display area and the second display area is being controlled by one target area.

S1024, determining the first area in the second display area as the target area.

In some embodiments, the first area may be an area away from the first display area in the second display area, and the target position information of the second area may be different from the target position information of the first area.

Figure 5A:
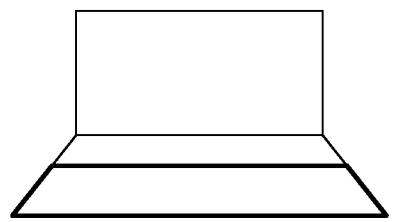
FIG. 5A is a schematic diagram of another target area when the electronic device is laid flat according to an embodiment of the present disclosure.
Figure 5B:
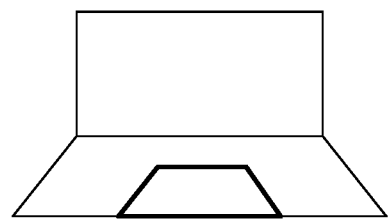
FIG. 5B is a schematic diagram of another target area when the electronic device is laid flat according to an embodiment of the present disclosure.

At this time, the electronic device may be in a horizontal open position, and the electronic device may be in a non-holding state. Take the convenience of the user's touch operation into consideration, the target area formed by the electronic device at this time may be as shown in FIG. 5A or FIG. 5B. Of course, in order to meet the user's individual needs, the user can also reset the target area in this state as needed. It can be seen from FIGS. 4, 5A, and 5B that the position and size of the first area and the second area are not the same.

S1025, determining whether the electronic device is in a second attitude based on the attitude information.

When implementing the process at S1025, a third angle between the first display area and the horizontal plane and a fourth angle between the second display area and the horizontal plane may be determined based on the attitude information, and whether the third angle and the fourth angle are both greater than a third angle threshold may be determined. If the third angle and the fourth angle are both greater than the third angle threshold, the electronic device can be determined to be in the second attitude, and the process at S1026 can be performed at this time. If the third angle is less than or equal to the third angle threshold and the fourth angle is less than or equal to the third angle threshold, the electronic device can be determined to be not in the second attitude, and the process returns to the process at S101 to continue to obtain attitude information and holding information of the electronic device.

In some embodiments, the third angle threshold may be 80°, and the third angle and fourth angle both being greater than 80° may indicate that the electronic device is in the vertical position. Further, whether a fifth angle between the first display area and the second display area is greater than a fourth angle threshold may be determined. The fourth angle threshold may be 60°, and the fifth angle being greater than 60° may indicate that the electronic device is in an open position. Therefore, when the third angle and the fourth angle are both greater than 80° and the fifth angle is greater than 60°, it may indicate that the electronic device is in the second attitude in which is electronic device is vertically opened. Of course, the third and fourth angle threshold can be preset by the manufacturer, or set by the user based on usage habits, which is not limited in the embodiments of the present disclosure.

S1026, determining whether the electronic device is in a holding state based on the holding information.

The implementation method of the process at S1026 is identical to the implementation method of the process at S1022, which will not be repeated here. Further, if it is determined that the electronic device is in a holding state, then the process at S1027 can be performed; and, if it is determined that the electronic device is in a non-holding state, then the process at S1028 can be performed.

S1027, determining the fifth area of the first display area and/or the sixth area of the second display area based on the holding information, and determining the fifth area and/or the sixth area as the target area.

The fifth area and/or the sixth area may include the holding area corresponding to the holding information. When the process at S1027 is implemented, the electronic device may be in a vertical open position and may be in a holding state, then the user's holding area can be determined based on the holding information. Further, the fifth area including the holding area may also be determined on the first display area. The second display area may include a sixth area including the holding area. The fifth area may be determined as the target area, the sixth may be determined as the target area, and the fifth area and the sixth area may both be determined as the target area.

Figure 6:
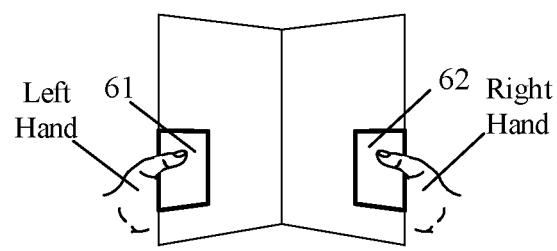
FIG. 6 is a schematic diagram of the target area when the electronic device is placed in a vertical position according to an embodiment of the present disclosure.

In some embodiments, the target area as shown in FIG. 6 can be determined through the process at S1027. In FIG. 6, the user holds the electronic device with the left hand and the right hand, which corresponding forms a target area 61 in the first display area (or the second display area) and a target area 42 in the second display area (or the first display area). In addition, the control of the target area 61 and the target area 62 can be realized by using the control method of the target area 41 and the target area 42 described above. In this way, the target area 61 and the target area 62 can work together.

S1028, determining the third area in the first display area and/or the fourth area in the second display area as the target area.

In some embodiments, the third area may be an area away from the second display area in the first display area, and the fourth area may be an area away from the first display area in the second display area.

Figure 7:
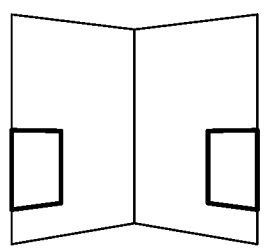
FIG. 7 is a schematic diagram of another target area when the electronic device is placed in the vertical position according to an embodiment of the present disclosure.

When the process at S1028 is implemented, the electronic device may be in a horizontal open position, and the electronic device may be in a non-holding state. Take the convenience of the user's touch operation into consideration, the target area formed by the electronic device at this time may be as shown in FIG. 7. Of course, in order to meet the user's individual needs, the user can also reset the target area in this state as needed.

After performing the processes of S1021 to S1028, the electronic device can form target areas of different positions and sizes under different attitudes and/or holding information, and correspondingly generate different touch parameters, thereby improving the applicability and convenience of electronic devices, enriching the function of electronic devices, and enhancing the performance of electronic devices. At the same time, it is convenient for the user to perform touch control in the target area, which improves the user's work efficiency and experience.

In some embodiments, after the target area is determined, and when the control mark is presented in the target area, the control method may further include the following processes.

S11, receiving touch operation for the target area.

Figure 8:
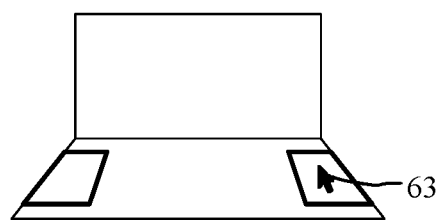
FIG. 8 is a schematic diagram of the target area being a transparent or semi-transparent area according to an embodiment of the present disclosure.

In the embodiments of the present disclosure, the target area can present a control mark. In this case, the target area can be a transparent area or a semi-transparent area enclosed by a wire frame. For example, as shown in FIG. 8, the control mark 63 is displayed in the target area.

S12, in response to the touch operation, controlling the control mark to execute an operation instruction corresponding to the touch operation.

In the embodiments of the present disclosure, when the control mark is displayed in the target area, the electronic device can receive the touch operation for the target area, and can control the control mark to execute the operation instruction corresponding to the touch operation.

At this time, the target area of the electronic device can not only realize the touch operation function, but also realize the normal display function, thereby improving the performance of the electronic device.

In some embodiments, after the target area is determined, and when the control mark is presented outside the target area, the control method may further include the following processes.

S22, determining the size information of an overlap area when it is determined that there is an overlap between the target area and a currently active window.

In some embodiments, the first display area and the second display area may display applications of the electronic device through a display window.

In the embodiments of the present disclosure, the shape of the target area may be rectangle, square, circle, semicircle, ellipse, etc. The size information may be the length, width, side length, diameter, circumference, area, major axis length, minor axis length, etc.

The target area may be a non-transparent layer at the top layer. The target area may be configured to detect the current active window in real time and determine whether the current active window overlaps with the target area. When it is determined that there is an overlapping area, the area of the overlapping area can be obtained.

S22, adjusting display attribute information of the currently active window in the first display area and/or the second display area when the size information is greater than a size threshold, such that the size of the overlapping area of the target area and the currently active window can be smaller than or equal to the size threshold.

In some embodiments, the display attribute information may include at least display position information and display size information.

Figure 9:
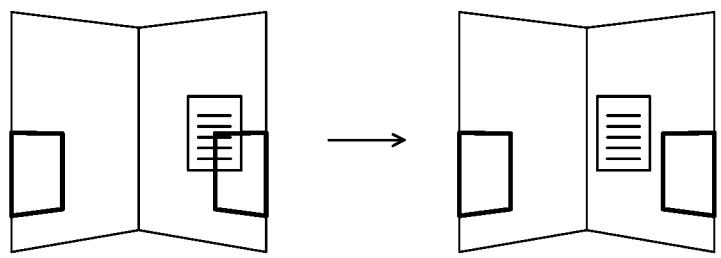
FIG. 9 is a schematic diagram of an adjustment of a current activation window according to an embodiment of the present disclosure.

Take the size information as the area as an example. The size threshold may be 10 $cm^2$. When the area of the overlapping area is greater than $cm^2$, the position of the currently active window can be adjusted. Assume that the currently active window is positioned in the second display area, then currently active window can be adjusted to the first display area. As shown in FIG. 9, the currently active window can also be adjusted to a blank space in the second display area.

In order to alert the user, the target area may also be set as a non-transparent layer. At this time, if the currently active window viewed by the user is blocked by the target area, the currently active window may automatically adjust its position, such that the currently active window is not blocked, thereby enhancing the flexibility of the electronic device.

In some embodiments, after performing the process at S104, the control method may further include the following processes.

S31, in response to a first touch operation for the target area, controlling the control mark to execute the operation instruction corresponding to the first touch operation based on a first touch parameter.

In some embodiments, the first touch parameter may be used to indicate the proportional relationship between the first displacement of the touch parameter in the target area and the second displacement of the control mark.

In the embodiments of the present disclosure, the first touch parameter may be the proportional relationship between the first displacement of the user in the target area and the second displacement of the control mark. That is, the first touch parameter may refer to the touch accuracy or the touch speed. Compared with the first touch parameter, a second touch parameter may be used to increase the touch speed or reduce the touch accuracy, that is, to reduce the value of the ratio. Alternatively, the second touch parameter may be used to reduce the touch speed or increase the touch accuracy, that is, to increase the value of the ratio. After the first touch parameter is determined based on the processes of S101 to S104, the operation instruction corresponding to the first touch parameter can be executed based on the first touch parameter controlling the control mark.

S32, in response to an adjustment instruction, adjusting the first touch parameter to obtain the second touch parameter when the adjustment instruction for adjusting a touch parameter is received.

In the embodiments of the present disclosure, the adjustment instruction may be an operation such as double-clicking, pressing for a certain period of time, and the like. In actual use, when the user moves the control mark close to a target object, it often requires high-precision touch parameters. Take the adjustment instruction as a double-click operation as an example. When the electronic device receives the user's double-click instruction, it may adjust the current first touch parameter to the second touch parameter with higher accuracy. Conversely, when the user moves the control mark away from the target object, a faster touch parameter is often required. Take the adjustment instruction as a double-click operation as an example. When the electronic device receives the user's double-click instruction, it may adjust the current first touch parameter to a faster second touch parameter.

S33, in response to a second touch operation for the target area, controlling the control mark to execute the operation instruction corresponding to the second touch operation based on the second touch parameter.

After the second touch parameter is determined, the electronic device may execute the operation instruction based on the second touch parameter with higher accuracy or faster speed.

In this way, the touch parameters can be more flexible, thereby further improving the performance of the electronic device.

In some embodiments, after performing the process at S104, the control method may further include the following processes.

S41, obtaining a movement operation for moving the target area.

In the embodiments of the present disclosure, the movement operation may be an operation such as holding and dragging on the target area, and double-clicking at a starting position and a target position respectively, and the electronic device may obtain the movement operation in real time.

S42, determining a target position of the target area based on the movement operation.

Take the movement operation as a hold-and-drag as an example. The hold-and-drag operation can be used to determine the end position of the drag, and then the end position can be determined as the target area position.

S43, in response to the movement operation, moving the target area to the target position.

In the embodiments of the present disclosure, after the position of the target area is determined, the target area can be moved to the determined target area position.

Figure 10:
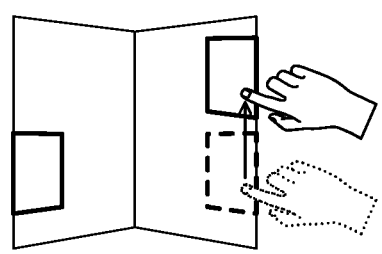
FIG. 10 is a schematic diagram of a movement of the target area according to an embodiment of the present disclosure.

In order to enrich the user's needs, when the user pre-optimizes the overall layout of the first display area and the second display area and needs to move the target area, the position of the target area as shown in FIG. 10 can be moved through the processes of S41 to S43. That is, the target area of the electronic device can be moved to the target area position based on the user's movement operation.

By performing the processes of S41 to S43, the functions of the electronic device can be enriched and the performance of the electronic device can be improved.

In some embodiments, the electronic device may also receive a cancel operation, and cancel the display of the target area based on the cancel operation. In some embodiments, the cancel operation may be a single-finger triple-click, a double-finger double-click, a double-finger triple-click on the target area, a touch (or press) of a physical button on the electronic device, etc. Take the single-finger triple-click as an example. When a user watches a video through an electronic device, both the first display area and the second display area may need to display the video, but the target area may not need to be displayed. In this case, the user can perform the single-finger triple-click operation on the formed target area, and the electronic device can cancel the display of the target area based on the single-finger triple-click operation when the electronic device receives the single-finger triple-click operation, thereby enriching the functions of the electronic device and improving the performance of the electronic device.

In some embodiments, after performing the process at S104, the control method may further include the following processes.

S51, obtaining operation information of the touch operation for the target area received within a preset period of time.

In the embodiments of the present disclosure, the preset period of time may be 10 days, 15 days, 20 days, etc., and the operation information may be the end position information of the touch operation, the operation trajectory information, etc. Take the preset period of time of 10 days and the operation information being the trajectory of the touch operation as an example. The electronic device may obtain the trajectory information of the touch operation within 10 days.

S52, determining a historical activity area of the touch operation based on the operation information.

In the embodiments of the present disclosure, the trajectory information of the touch operation within 10 days may be analyzed and obtained, and the historical activity area of the touch operation can be determined.

S53, adjusting the size information of the target area based on the historical activity area.

In the embodiments of the present disclosure, the shape of the target area may be rectangle, square, circle, semicircle, ellipse, etc. The size information may be the length, width, side length, diameter, circumference, area, major axis length, minor axis length, etc. Take the target area as a rectangle and the size information as the area as an example. In order to adapt to each user's usage habits, the electronic device may adjust the area of the target area based on the user's historical activity area. In implementation, when it is found that the user's historical activity area frequently gathers at the edge of the target area, it may indicate that the user's hand is relatively large, and the area of the target area needs to be increased to facilitate the user's subsequent touch operations. Conversely, when it is found that the user's historical activity area frequently gathers in the center of the target area, it may indicate that the user's hand is relatively small, and the area of the target area needs to be reduced to facilitate the user's subsequent touch operations. In this way, the functions of the electronic device can be enriched, and the performance of the electronic device can be improved.

In some embodiments, take the electronic device being a dual-screen laptop, the target area is the touchpad area, and the control mark is the cursor as an example. Sides B and C can be connected to a microcontroller unit (MCU). The MCU may be a new MCU embedded in the dual-screen laptop or the original MCU in the dual-screen laptop. The MCU can be used to receive and process the user's touch operation, such that when the user operates the touchpad, the MCU can control the touchpad area. Further, the MUC can also be used to convert the user's touch operation into the operation corresponding to the Microsoft standard touchpad, thereby achieving the same touch function as the physical touch panel that comes with Microsoft.

Combined with the following usage scenarios of a dual-screen laptop, the control method described in the foregoing embodiments can be implemented as follow.

In the first scenario, the laptop is in a horizontal non-holding position. In this scenario, as shown in FIG. 5A and FIG. 5B, the touchpad area can be set on side C, and combined with the usage habits of most people, the area of the touchpad area can be adjusted to a relatively large area. At the same time, the MCU may automatically reduce the number of pixels per inch (dots per inch, DPI) of the image, that is, reduce the speed of the cursor, and the MCU may also increase the touch accuracy of the touch operation to provide more precise control. In addition, if the currently active window is blocked by the touchpad area, in order for the user to perform operations on the currently active window, the MCU may adjust the currently active window to side B, thereby increasing the flexibility and intelligence of the dual-screen laptop touchpad.

In the second scenario, the laptop is in a horizontal holding position. In this scenario, on one hand, the user has to hold and fix the dual-screen laptop with both hands, and on the other hand, the user needs to manipulate the touchpad area with the thumb. To facilitate the user's thumb to operate the touchpad area, the touchpad area as shown in FIG. 4 can be used. Take the user's holding and reading habits into consideration, the touchpad area may be positioned in the middle of the two sides of side C, thereby enhancing the touchpad function of the dual-screen laptop.

In the third scenario, the laptop is in a vertical non-holding position. In this scenario, as shown in FIG. 7, the touchpad area can be automatically divided into two areas, which are positioned in the lower left corner and the lower right corner of the usage scenario, such that either the left hand or the right hand of the user can conveniently and comfortably operate the touchpad area. At the same time, the area of the touchpad area can be reduced, leaving more visual space for the desktop. With the reduction of the area, the speed of the cursor will be increased, such that the user can move the cursor to a longer distance when operating with the thumb, thereby improving the performance of the dual-screen laptop touchpad.

In the third scenario, the laptop is in a vertical holding position. In this scenario, on one hand, the user has to hold and fix the dual-screen laptop with both hands, and on the other hand, the user needs to manipulate the touchpad area with the thumb. To facilitate the user's thumb to operate the touchpad area, the touchpad area as shown in FIG. 6 can be used. Take the user's holding and reading habits into consideration, the touchpad area may be positioned at a lower position on both sides of sides B and C, thereby enhancing the convenience of the dual-screen laptop touchpad.

In the implementation of the first scenario to the fourth scenario, when the user moves the cursor close to the target area, the user can trigger the high-precision mode of the touchpad by keeping the first finger in contact and double-clicking the adjustment operation of the touchpad area with the second finger. In the high-precision mode, the speed of the cursor is reduced, and the touch accuracy is improved, such that the user can locate the target area more accurately. Further, when all the fingers of the user leave the touchpad area, the cursor speed (or touch accuracy) can be restored to the cursor speed (or touch accuracy) before the adjustment, thereby optimizing the touch function of the dual-screen laptop.

Based on the foregoing embodiments, an embodiment of the present disclosure provides a touch apparatus. The modules included in the apparatus and the elements included in each module may be implemented by a processor in a computer device;

and of course, they may also be implemented by a specific logic circuit. In the implementation process, the processor can be a central processing unit (CPU), a microprocessor unit (MPU), a digital signal processor (DSP), a field programmable gate array (FPGA), etc.

Figure 11:
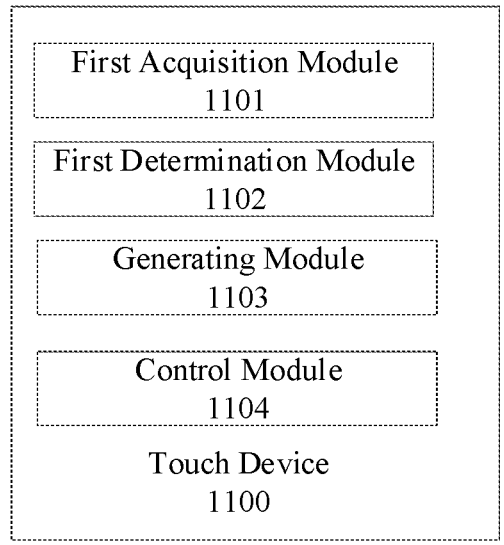
FIG. 11 is a schematic structural diagram of a touch device according to an embodiment of the present disclosure.

An embodiment of the present disclosure further provides a touch device. FIG. 11 is a schematic structural diagram of a touch device 1100 according to an embodiment of the present disclosure. As shown in FIG. 11, the touch device 1100 includes a first acquisition module 1101, configured to obtain attitude information and/or holding information of the electronic device; a first determination module 1102, configured to determine a target area located in the first display area and/or the second display area based on the attitude information and/or the holding information, and present a control mark in the first display area or the second display area, the position and size of the target area being variable; a generating module 1103, configured to generate touch parameters based on the size information of the target area; and a control module 1104, configured to control the control mark to execute the operation instruction corresponding to the touch operation based on the touch parameter in response to the touch operation for the target area.

In some embodiments, the second display area may include a touch function, and the first determination module 1102 may include a first determination unit, configured to determine whether the electronic device is in a holding state when it is determined that the electronic device is in the first attitude based on the attitude information. In some embodiments, when the electronic device is in the first attitude, the angle between the second display area and the horizontal plane may be less than a first angle threshold, and the angle between the first display area and the horizontal plane may be greater than a second angle threshold.

In some embodiments, the first determination module 1102 may further include a second determination unit, configured to determine the first area in the second display area as the target area when it is determined that the electronic device is not in the holding state, the first area being an area of the second display area away from the first display area.

In some embodiments, the first determination module 1102 may further include a third determination unit, configured to the second area of the second display area based on the holding information when it is determined that the electronic device is in the holding state. The second area may include a holding area corresponding to the holding information, and the target position information of the second area may be different from the target position information of the first area.

In some embodiments, the first determination module 1102 may further include a fourth determination unit, configured to determine the second area as the target area.

In some embodiments, both the first display area and the second display area may have a touch function, and the first determination module 1102 may further include a fifth determination unit. The fifth determination unit may be configured to determine whether the electronic device is in the holding state when it is determined that the electronic device is in the second attitude based on the attitude information. In some embodiments, when the electronic device is in the second attitude, the angle between the second display area and the horizontal plane may be greater than a third angle threshold, and the angle between the first display area and the horizontal plane may be greater than the third angle threshold.

In some embodiments, the first determination module 1102 may further include a sixth determination unit. The sixth determination unit may be configured to determine the third area in the first display area and/or the fourth area in the second display area as the target area. some embodiments, the third area may be an area away from the second display area in the first display area, and the fourth area may be an area away from the first display area in the second display area.

In some embodiments, the first determination module 1102 may further include a seventh determination unit. The seventh determination unit may be configured to determine the fifth area of the first display area and/or the sixth area of the second display area based on the holding information when it is determined that the electronic device is in the holding state. The fifth area and/or the sixth area may include the holding area corresponding to the holding information.

In some embodiments, the first determination module 1102 may further include an eighth determination unit. The eighth determination unit may be configured to determine the fifth area and/or the sixth area as the target area.

In some embodiments, the touch device 1100 may further include a first enabling module. The first enabling module may be configured to enable the third area to receive a touch operation for controlling the control mark through the third area, or enable the fourth area to receive a touch operation for controlling the control mark through the fourth area based on a first preset rule.

In some embodiments, the touch device 1100 may further include a second enabling module. The second enabling module may be configured to enable the fifth area to receive a touch operation for controlling the control mark through the fifth area, or enable the sixth area to receive a touch operation for controlling the control mark through the sixth area based on a second preset rule.

In some embodiments, the touch device 1100 may further include a first control module. The first control module may be configured to control the control mark to execute the operation instruction corresponding to the first touch operation based on the first touch parameter in response to the first touch operation for the target area. In some embodiments, the first touch parameter may be used to indicate the proportional relationship between the first displacement of the touch parameter in the target area and the second displacement of the control mark.

In some embodiments, the touch device 1100 may further include a first adjustment module. The first adjustment module may be configured to adjust the first touch parameter in response to an adjustment instruction to obtain a second touch parameter when the adjustment instruction for adjusting a touch parameter is received.

In some embodiments, the touch device 1100 may further include a second control module. The second control module may be configured to control the control mark to execute the operation instruction corresponding to the second touch operation based on the second touch parameter in response to the second touch operation for the target area.

In some embodiments, the first determination module 1102 may further include a receiving unit. The receiving unit may be configured to receive a touch operation for the target area when the control mark is presented in the target area.

In some embodiments, the first determination module 1102 may further include a control unit. The control unit may be configured to control the control mark to execute the operation instruction corresponding to the touch operation in response to the touch operation.

In some embodiments, the first display area and the second display area in the electronic device may display applications of the electronic device through a display window.

In some embodiments, the touch device 1100 may further include a second determination module. The second determination module may be configured to determine the size information of an overlapping area when it is determined that there is an overlapping area between the target area and the currently active window.

In some embodiments, the touch device 1100 may further include a second adjustment module. The second adjustment module may be configured to adjust the display attribute information of the currently active window in the first display area and/or the second display area when the size information is greater than a size threshold, such that the size information of the overlapping area of the target area and the currently active window may be less than or equal to the size threshold. In some embodiments, the display attribute information may include at least the display position information and the display size information.

In some embodiments, the touch device 1100 may further include a second acquisition module. The second acquisition module may be configured to obtain a movement operation for moving the target area. The touch device 1100 may further include a third determination module. The third determination module may be configured to determine a target position of the target area based on the movement operation. The touch device 1100 may further include a movement module. The movement module may be configured to move the target area to the target position in response to the movement operation.

In some embodiments, the touch device 1100 may further include a third acquisition module. The third acquisition module may be configured to obtain the operation information of the touch operation for the target area received within a preset period of time. The touch device 1100 may further include a fourth determination module. The fourth determination module may be configured to determine the historical activity area of the touch operation based on the operation information. The touch device 1100 may further include a third adjustment module. The third adjustment module may be configured to adjust the size information of the target area based on the historical activity area.

It should be noted that when the above-mentioned touch control method is implemented in the form of a software functional module being sold or used as an independent product, it may also be stored in a computer-readable storage medium. Based on this understanding, the technical solutions provided by the embodiments of the present disclosure essentially or partially may be embodied in the form of a software product stored in a storage medium. The storage medium stores instructions which are executed by a computer device (which may be a personal computer, a server, a network device, or the like) to realize all or a part of the embodiments of the present disclosure. The above-mentioned storage medium may include various media capable of storing program codes, such as a removable storage device, a read only memory (ROM), a random-access memory (RAM), a magnetic disk, or an optical disk.

Correspondingly, an embodiment of the present disclosure further provides a computer-readable storage medium having a computer program stored thereon. When the computer program is executed by a processor, the processes of the touch control method described in the foregoing embodiments can be implemented.

Figure 12:
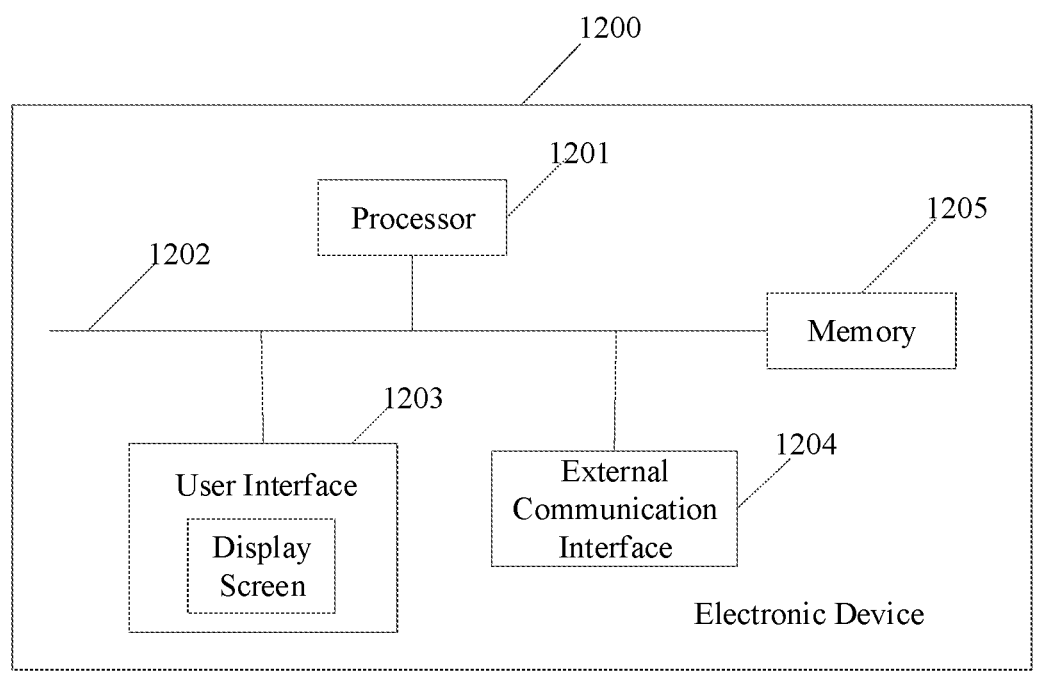
FIG. 12 is schematic structural diagram of the electronic device according to an embodiment of the present disclosure.

An embodiment of the present disclosure further provides an electronic device. FIG. 12 is schematic structural diagram of an electronic device 1200 according to an embodiment of the present disclosure. As shown in FIG. 12, the electronic device 1200 includes a processor 1201, at least one communication bus 1202, a user interface 1203, at least one external communication interface 1204, and a memory 1205. The communication bus 1202 may be configured to realize the connection and communication between these components. The user interface 1203 may include a display screen, and the display screen may include a first display area and a second display area. The external communication interface 1204 may include a standard wired interface and a wireless interface. The processor 1201 may be configured to execute the program of the touch control method stored in the memory, thereby implementing the processes of the touch control method described in the foregoing embodiments can be implemented.

It should be noted here that the description of the foregoing apparatus, device, electronic device, and computer-readable storage medium embodiments is similar to the description of the above method embodiments, which can achieve similar beneficial effects of the method embodiments, therefore repetitive description is omitted herein. With respect to the technical details not disclosed in the apparatus embodiments of the present disclosure, please refer to the description of the method embodiments of the present disclosure for a better understanding. In order to make the description succinct, these are not repeated herein.

A person skilled in the art should understand that the phrases "one embodiment" or "an embodiment" referenced in this specification indicate that particular characteristics, structures, or features associated with that embodiment may be incorporated into at least one embodiment consistent with this disclosure. Therefore, the phrases "in one embodiment" or "in an embodiment" in this specification do not necessarily refer to the same embodiment. In addition, the described characteristics, structures, or features may be incorporated in one or more embodiments in any suitable manner. It should be understood that in various embodiments of the present invention, the sequence numbers of the above various processes or steps do not denote a preferred sequence of performing the processes or steps; and the sequence of performing the processes and steps should be determined according to the functions and internal logics thereof, which shall not cause any limitation to the implementation process of the embodiments of the present invention. The sequential numbers of the embodiments of the present invention are for description purpose only, and they do not denote preference of the embodiments.

It should be noted that, in this specification, terms such as "comprises", "comprising", "includes", "including", "contains", "containing" or any other variation thereof, are intended to cover a non-exclusive inclusion, such that a process, method, article, or apparatus, that comprises, has, includes, contains a list of elements include not only those elements but may include other elements not expressly listed or inherent to such process, method, article, or apparatus. An element proceeded by "comprises a . . . ", "has a . . . ", "includes a . . . ", "contains a . . . " does not, without more constraints, preclude the existence of additional identical elements in the process, method, article, or apparatus.

It shall be understood that the devices and methods disclosed in the embodiments provided in the application may be implemented in other ways. The device embodiments described above are merely illustrative. For example, the division of units is merely a division based on logical functions and there may be other ways of division in real practice. For example, multiple units or components may be combined, or may be integrated into another system, or some features may be omitted or not performed. Additionally, coupling, direct coupling, or communication connections among the component parts as shown or discussed may be implemented through some interface(s), and indirect coupling or communication connections of devices or units may be in an electrical, mechanical, or other form.

The units described as separate components may or may not be physically independent of each other. The element illustrated as a unit may or may not be a physical unit, and it can be located at one place or deployed on a plurality of network units. A part or all of the units may be selected according to actual needs to achieve the objectives of the solutions of the embodiments.

In addition, the functional units in the various embodiments of the present disclosure may be integrated in one processing unit, or may exist as separate units respectively, or two or more units as described above may be integrated into one unit. The integrated unit may be practiced by means of a hardware, or may also be practiced in a form of a hardware and a software functional unit.

It can be appreciated by those skilled in the art that some or all of the steps in the method embodiments as described above can be implemented by hardware following instructions of a program. Such program can be stored in a computer readable storage medium and, when executed, performs the steps of the above method embodiments. The storage medium may be any of various mediums capable of storing program codes, such as a mobile storage device, a read-only memory (ROM), a random-access memory (RAM), a magnetic disk or an optical disc.

Alternatively, when the above integrated units of the present disclosure are implemented in software functional modules and sold or used as a standalone product, they can be stored in a computer readable storage medium. In view of this, the technical solutions according to the embodiments of the present disclosure, or in other words a part thereof which makes contribution over the prior art, can be substantially embodied in a form of software product. The computer software product can be stored in a storage medium, such as ROM/RAM, magnetic disk, optical disc and the like, containing instructions which cause a computer device (which can be a personal computer, a server, a network device or the like) to perform one or more methods according to the embodiments of the present disclosure or particular parts thereof. The storage medium may be any of various mediums capable of storing program codes, such as a mobile storage device, a ROM, a RAM, a magnetic disk or an optical disc.

The above are only some specific embodiments of the present invention, and the protection scope of the present disclosure is not limited thereto. Variations or alterations that are within the technical scope as disclosed in the present invention and may be readily conceived by those skilled in the art shall fall within the protection scope of the present invention. Accordingly, the protection scope of the present invention is defined by the claims.

What is claimed is:

1. A touch control method comprising:
obtaining attitude information and holding information of an electronic device;
determining a target area located in a first display area of the electronic device and/or a second display area of the electronic device, and presenting a control mark in the first display area or the second display area based on the attitude information and the holding information;
generating a touch parameter based on size information of the target area; and
controlling the control mark to execute an operation instruction corresponding to a touch operation based on the touch parameter in response to the touch operation for the target area wherein the second display area supports a touch function, and determining the target area located in the first display area and/or the second display area includes:
determining whether the electronic device is in a holding state;
determining a second area of the second display area based on the holding information in response to when it is determined that the electronic device is in the holding state, the second area including a holding area corresponding to the holding information, and target position information of the second area being different from the target position information of the first area;
determining a first area in the second display area as the target area when it is determined that the electronic device is not in the holding state, the first area being an area of the second display area away from the first display area; and
determining the second area as the target area.

2. The method of claim 1, wherein determining whether the electronic device is in a holding state includes:
determining whether the electronic device is in a holding state when it is determined that the electronic device is in a first attitude based on the attitude information, wherein an angle between the second display area and a horizontal plane is less than a first angle threshold, and an angle between the first display area and the horizontal plane is greater than a second angle threshold when the electronic device is in the first attitude.

3. The method of claim 1, wherein the first display area and the second display area both include the touch function, and determining the target area located in the first display area and/or the second display area includes:
determining whether the electronic device is in the holding state when it is determined that the electronic device is in a second attitude based on the attitude information, wherein the angle between the second display area and the horizontal plane is greater than a third angle threshold, and the angle between the first display area and the horizontal plane is greater than the third angle threshold when the electronic device is in the second attitude;

determining a third area in the first display area and/or a fourth area in the second display area as the target area when it is determined that the electronic device is not in the holding state, the third area being an area away from the second display area in the first display area, and the fourth area being an area away from the first display area in the second display area;

determining a fifth area of the first display area and/or a sixth area of the second display area based on the holding information when it is determined that the electronic device is in the holding state, the fifth area and/or the sixth area including the holding area corresponding to the holding information; and determining the fifth area and/or the sixth area as the target area.

4. The method of claim 3, wherein after determining the third area in the first display area and/or the fourth area in the second display area as the target area, further comprising:

enabling the third area to receive the touch operation for controlling the control mark through the third area, or enabling the fourth area to receive the touch operation for controlling the control mark through the fourth area based on a first preset rule; and after determining the fifth area and/or the sixth area as the target area, further comprising:

enabling the fifth area to receive the touch operation for controlling the control mar through the fifth area, or enabling the sixth area to receive the touch operation for controlling the control mark through the sixth area based on a second preset rule.

5. The method of claim 1, further comprising:

controlling the control mark to execute the operation instruction corresponding to a first touch operation based on a first touch parameter, the first touch parameter being used to indicate a proportional relationship between a first displacement of the touch parameter in the target area and a second displacement of the control mark;

in response to receiving an adjustment instruction for adjusting the touch parameter, adjusting the first touch parameter to obtain a second touch parameter in response to the adjustment instruction; and in response to a second touch operation for the target area, controlling the control mark to execute the operation instruction corresponding to the second touch operation based on the second touch parameter.

6. The method of claim 1, wherein presenting the control mark in the first display area or the second display area includes:

receiving the touch operation for the target area when the control mark is presented in the target area; and controlling the control mark to execute the operation instruction corresponding to the touch operation in response to the touch operation.

7. The method of claim 1, further comprising:

in response to determining an overlapping area between the target area and a currently active window, determining the size information of the overlapping area;

adjusting display attribute information of the currently active window in the first display area and/or the second display area when the size information is greater than a size threshold for the size information of the overlapping area between the target area and the currently active window to be less than or equal to the size threshold, the display attribute information including at least display position information and display size information.

8. The method of claim 1, further comprising:

obtaining a movement operation for moving the target area;

determining a target position of the target area based on the movement operation; and moving the target area to the target position in response to the movement operation.

9. The method of claim 1, further comprising:

obtaining operation information of the touch operation for the target area received within a preset period of time;

determining an historical activity area of the touch operation based on the operation information; and adjusting the size information of the target area based on the historical activity area.

10. An electronic device comprising a first display area, a second display area, a processor, and a memory storing program instructions that, when being executed by the processor, cause the processor to implement a method comprising:

obtaining attitude information and holding information of the electronic device;

determining a target area located in the first display area and/or the second display area, and present a control mark in the first display area or the second display area based on the attitude information and/or the holding information;

generating a touch parameter based on size information of the target area; and controlling the control mark to execute an operation instruction corresponding to a touch operation based on the touch parameter in response to the touch operation for the target area, wherein, the second display area supports a touch function, and determining the target area located in the first display area and/or the second display area includes:

determining whether the electronic device is in a holding state;

determining a first area in the second display area as the target area when it is determined that the electronic device is not in the holding state, the first area being an area of the second display area away from the first display area;

determining a second area of the second display area based on the holding information when it is determined that the electronic device is in the holding state, the second area including a holding area corresponding to the holding information, and target position information of the second area being different from the target position information of the first area; and determining the second area as the target area.

11. The electronic device of claim 10, determining whether the electronic device is in a holding state includes:

determining whether the electronic device is in a holding state when it is determined that the electronic device is in a first attitude based on the attitude information, wherein an angle between the second display area and a horizontal plane is less than a first angle threshold, and an angle between the first display area and the horizontal plane is greater than a second angle threshold when the electronic device is in the first attitude.

12. The electronic device of claim 11, wherein the method further comprising:

controlling the control mark to execute the operation instruction corresponding to a first touch operation based on a first touch parameter, the first touch parameter being used to indicate a proportional relationship between a first displacement of the touch parameter in the target area and a second displacement of the control mark;

in response to receiving an adjustment instruction for adjusting the touch parameter, adjusting the first touch parameter to obtain a second touch parameter in response to the adjustment instruction; and in response to a second touch operation for the target area, controlling the control mark to execute the operation instruction corresponding to the second touch operation based on the second touch parameter.

13. The electronic device of claim 10, wherein the first display area and the second display area both include the touch function, and determining the target area located in the first display area and/or the second display area includes:

determining whether the electronic device is in the holding state when it is determined that the electronic device is in a second attitude based on the attitude information, wherein the angle between the second display area and the horizontal plane is greater than a third angle threshold, and the angle between the first display area and the horizontal plane is greater than the third angle threshold when the electronic device is in the second attitude;

determining a third area in the first display area and/or a fourth area in the second display area as the target area when it is determined that the electronic device is not in the holding state, the third area being an area away from the second display area in the first display area, and the fourth area being an area away from the first display area in the second display area;

determining a fifth area of the first display area and/or a sixth area of the second display area based on the holding information when it is determined that the electronic device is in the holding state, the fifth area and/or the sixth area including the holding area corresponding to the holding information; and determining the fifth area and/or the sixth area as the target area.

14. The electronic device of claim 13, wherein after determining the third area in the first display area and/or the fourth area in the second display area as the target area, the method further comprising:

enabling the third area to receive the touch operation for controlling the control mark through the third area, or enabling the fourth area to receive the touch operation for controlling the control mark through the fourth area based on a first preset rule; and after determining the fifth area and/or the sixth area as the target area, further comprising:

enabling the fifth area to receive the touch operation for controlling the control mar through the fifth area, or enabling the sixth area to receive the touch operation for controlling the control mark through the sixth area based on a second preset rule.

15. The electronic device of claim 10, wherein presenting the control mark in the first display area or the second display area includes:

receiving the touch operation for the target area when the control mark is presented in the target area; and controlling the control mark to execute the operation instruction corresponding to the touch operation in response to the touch operation.

16. The electronic device of claim 10, wherein the method further comprising:

in response to determining an overlapping area between the target area and a currently active window, determining the size information of the overlapping area;

adjusting display attribute information of the currently active window in the first display area and/or the second display area when the size information is greater than a size threshold for the size information of the overlapping area between the target area and the currently active window to be less than or equal to the size threshold, the display attribute information including at least display position information and display size information.

17. The electronic device of claim 10, wherein the method further comprising:

obtaining a movement operation for moving the target area;

determining a target position of the target area based on the movement operation; and moving the target area to the target position in response to the movement operation.

18. The electronic device of claim 10, wherein the method further comprising:

obtaining operation information of the touch operation for the target area received within a preset period of time;

determining an historical activity area of the touch operation based on the operation information; and adjusting the size information of the target area based on the historical activity area.

* * * * *